United States Patent
Laaser et al.

(10) Patent No.: US 7,606,835 B2
(45) Date of Patent: Oct. 20, 2009

(54) AUTOMATIC RULES DRIVEN DATA VISUALIZATION SELECTION

(75) Inventors: William Taylor Laaser, Palo Alto, CA (US); Nicholas Philip Dearden, Los Gatos, CA (US); Timothy Glenn MacNary, Fairfield, CT (US)

(73) Assignee: Oracle International Corporation, Redwood Shores, CA (US)

( * ) Notice: Subject to any disclaimer, the term of this patent is extended or adjusted under 35 U.S.C. 154(b) by 311 days.

(21) Appl. No.: 11/354,348

(22) Filed: Feb. 14, 2006

(65) Prior Publication Data

US 2009/0150411 A1 Jun. 11, 2009

(51) Int. Cl.
*G06F 17/30* (2006.01)
(52) U.S. Cl. .................................. 707/104.1
(58) Field of Classification Search ............. 707/2, 707/104.1; 709/224; 345/440
See application file for complete search history.

(56) References Cited

U.S. PATENT DOCUMENTS

| | | | |
|---|---|---|---|
| 6,222,540 B1 * | 4/2001 | Sacerdoti | 345/581 |
| 6,828,968 B1 * | 12/2004 | Tenorio | 345/440 |
| 2002/0147757 A1 * | 10/2002 | Day et al. | 709/1 |
| 2002/0188948 A1 * | 12/2002 | Florence | 725/46 |
| 2005/0144295 A1 * | 6/2005 | Tsunoda et al. | 709/228 |
| 2006/0136825 A1 * | 6/2006 | Cory et al. | 715/700 |

OTHER PUBLICATIONS

Thomsen, Erik, "OLAP Solutions, Second Edition, Building Multi-dimensional Information Systems," Chapter 9, John Wiley & Sons, © 2002, pp. 215-245.

* cited by examiner

*Primary Examiner*—Etienne P LeRoux
(74) *Attorney, Agent, or Firm*—Townsend and Townsend and Crew LLP

(57) ABSTRACT

A solution is provided that automatically decides what visualization is best suited to present specified data. This is accomplished using a rules-based system that determines the type and properties of a visualization based on data and its corresponding metadata. The data and metadata may be checked against one or more rules, and depending upon which rule or rules match, a corresponding visualization and option combination may be utilized.

24 Claims, 3 Drawing Sheets

AUTOMATIC RULES DRIVEN DATA VISUALIZATION SELECTION

The present invention relates to the field of computer data. More specifically, the present invention relates to the automatic rule driven selection of a visualization of data.

BACKGROUND OF THE INVENTION

Many business software charting packages exist to allow users to easily create and display data in visual forms. Some common visual forms include pie charts, line charts, bar charts, bubble charts, radar charts, etc. Typically the way these packages work is that the user specifies certain data, and then manually specifies the chart type and any options that may be needed to use that chart type to present the data. For example, the user may select a series of income-related transactions, indicate that he wants to see a line chart, and then indicate that the line chart should display total income per month. While this provides flexibility to the user in choosing various visualizations, it can sometimes be difficult or cumbersome for the user to select which visualization to use and which options to select.

Alternatively, some business software packages have a chart type hardwired into the system. For example, the software may simply always use a line chart. While this puts less burden on the user to select a chart, it also obviously reduces the flexibility of the software package.

A hybrid alternative utilized by some business software packages is to provide the user with a wizard, which is a step-by-step interaction, for specifying the chart type and the options needed to use that chart type to present the data. However, fundamentally, the user is still in a position where he must specify the desired visualization.

The typical business user wishes to see their data in some visual form. However, they are not interested in the process of identifying what form of visualization is best suited for their data. What is needed is a solution where the user identifies the data he wishes to use, and then the system automatically decides what visualization is best suited to present the data.

BRIEF DESCRIPTION

A solution is provided that automatically decides what visualization is best suited to present specified data. This is accomplished using a rules-based system that determines the type and properties of a visualization based on data and its corresponding metadata. The data and metadata may be checked against one or more rules, and depending upon which rule or rules match, a corresponding visualization and option combination may be utilized.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
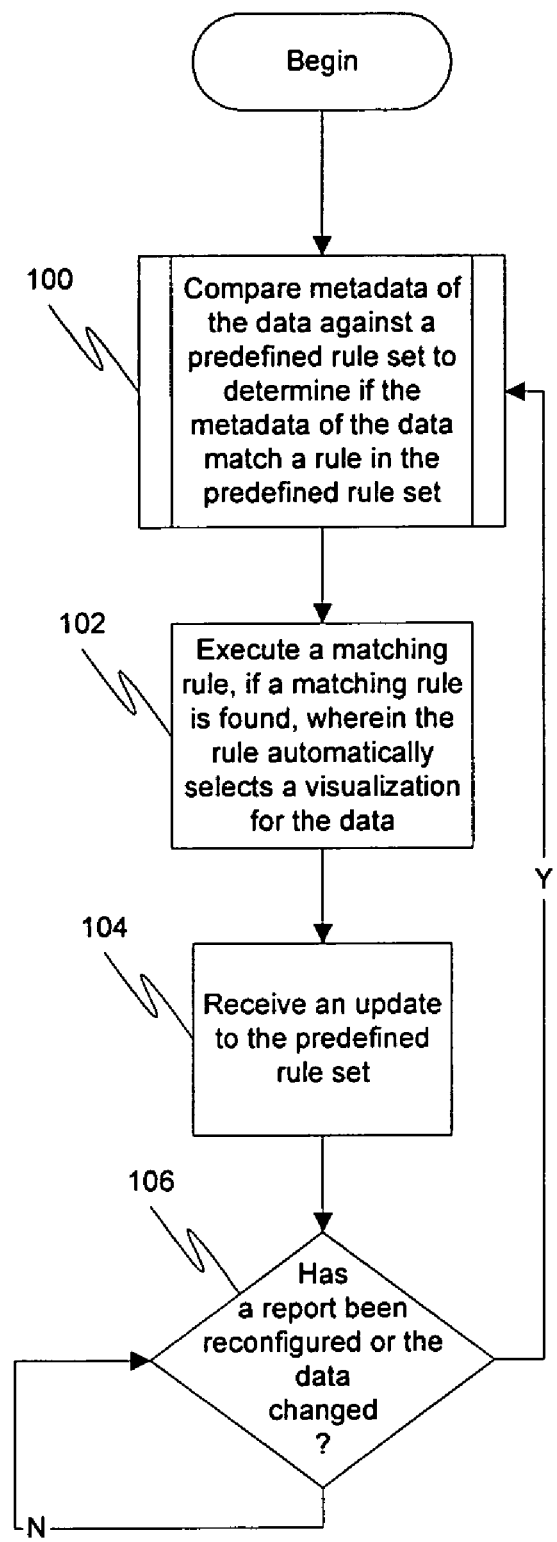
FIG. 1 is a flow diagram illustrating a method for automatically visualizing data in a computer system in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A solution is provided that automatically decides what visualization is best suited to present specified data. This is accomplished using a rules-based system that determines the type and properties of a visualization based on data and its corresponding metadata. The data and metadata may be checked against one or more rules, and depending upon which rule or rules match, a corresponding visualization and option combination may be utilized.

It should be noted that while the system may automatically select a particular visualization to use as well as visualization options, embodiments are foreseen where the user has the option to override the automatic selection of the visualization or the options (or both). Furthermore, in an embodiment of the present invention, different rules may be utilized in different installations of the same software. For example, one organization may wish to have data with a certain set of properties to be presented as one visualization (for example, a bar chart), while a different organization may wish to have data with the same set of properties to be presented with a different visualization (for example, a line chart). An embodiment of the present invention allows each organization to tailor their use of the invention to best suit the needs of their users.

An embodiment of the present invention includes a rule-based system for determining the type and properties of a visualization based on data (and its metadata). The rules may deal with properties including, but not limited to:

a) Number of data fields b) Total number of data values to be displayed c) Types of data fields (e.g., numeric, string, categorical, time, etc.)

d) Properties about the data fields (e.g., aggregatable, fact, dimension, etc.)

e) Relationships between the data fields (e.g., dependencies).

In general, the rules mainly apply to the fields being displayed (such as Sales, Product, Period) rather than the individual data values (such as Sales=$5,000,000, Product=Workstation, Period=2005). However, embodiments are foreseen where the rule apply to the specific values.

In an embodiment of the present invention, the rules are ordered, with each rule being checked in turn until a rule is found that matches the data to be displayed. This provides a mechanism to determine which rule to apply when multiple rules match the data. However, alternative embodiments are foreseen where various "tie-breakers" are applied in such instances.

This rules-based approach allows the definition of the rules to be separate from the application presenting the visualization. As a result, different installations may use different sets of rules depending upon their needs.

In an embodiment of the present invention, each rule may have a visualization type associated with it and a mechanism for specifying various properties of the visualization from the data. When a rule matches the data, the visualization associated with the rule may then be used to present the data.

For example, the following rule:

| Rule: | Number of fields: | 2 |
|---|---|---|
| | Field 1 type: | Categorical |
| | Field 2 type: | Numeric |
| | Field 1 property: | Dimension for facts |
| | Field 2 property: | Fact |
| | Field 2 property: | Aggregatable |
| Visualization: | Pie Chart | |
| | Slice Name: | Field 1 |
| | Slice Size: | Field 2 | would automatically create a pie chart when, for example, the fields Region and Sales are chosen (Sales by Region), or the fields Product and Costs are chosen (Costs by Product).

Similarly, the following rule:

| Rule: | Number of fields: | 2 |
|---|---|---|
| | Field 1 type: | Time |
| | Field 2 type: | Numeric |
| | Field 1 property: | Dimension for facts |
| | Field 2 property: | Fact |
| | Field 2 property: | Aggregatable |
| Visualization: | Line Chart | |
| | X-axis: | Field 1 |
| | Y-axis: | Field 2 | would automatically create a line chart when, for example, the fields Quarter and Sales are chosen (Sales by Quarter), or the fields Month and Headcount are chosen (Headcount by Month).

Additionally, the following rule:

| Rule: | Number of fields: | 3 |
|---|---|---|
| | Field 1 type: | Time |
| | Field 2 type: | Categorical |
| | Field 3 type: | Numeric |
| | Field 1 property: | Dimension for facts |
| | Field 2 property: | Dimension for facts |
| | Field 3 property: | Fact |
| | Field 3 property: | Aggregatable |
| Visualization: | Stacked Bar Chart | |
| | X-axis: | Field 1 |
| | Bar grouping: | Field 2 |
| | Bar size: | Field 3 | would automatically create a stacked bar chart when, for example, the fields Quarter, Region, and Sales are chosen (Sales by Product per Quarter), or when the fields Month, Department, and Expenses are chosen (Expenses by Department per Month).

Note that in the above examples, an ordering was provided for the fields to make the examples clear. The present invention does not imply any explicit ordering. Instead, the fields can be matched independently of their ordering. For example, the rule in the first example would work just as well for the fields Sales and Region as for Region and Sales.

Additionally, each rule may also specify additional data to be obtained to complete the visualization. For example, the following rule:

| Rule: | Number of fields: | 1 |
|---|---|---|
| | Field 1 type: | Numeric |
| | Field 1 property: | Fact |
| Visualization: | Line Chart | |
| | X-axis: | Quarter |
| | Y-axis: | Field 1 | would add Quarter to the data request even though it was not identified by the user. This rule would create a line chart when, for example, the field Sales is chosen (Sales by Quarter), or when the field Expenses is chosen (Expenses by Quarter).

Furthermore, in an embodiment of the present invention, hierarchical rules may be supported. Since rule sets are typically stepped through in order, an issue arises when two or more rules would ordinarily match the metadata. In such cases of a tie, ordinarily the first matching rule encountered would be executed while the remaining matching rules ignored. As such, this can place an increased burden on the creator of the rule set to ensure that the ordering chosen for the rule accurately reflects the intent for certain rules to be executed over other rules. Additionally, it places an increased computational burden on the system, which may need to compare a number of different metadata characteristics at once (e.g., dimensions, volume, type must all be compared against each rule). Hierarchical rules, on the other hand, allow the creator of the rule set to specify only a subset of characteristics to compare in a first pass. For example, a first level of hierarchical rule may simply examine volume. Then for a matching volume rule, a series of sub-rules (a second level) may be compared to examine, e.g., type. Then another series of sub-rules (a third level) may be compared to examine, e.g., dimensions. In some instances, for example, a certain volume may be all that is necessary to determine an appropriate visualization for the data. In such instances, the use of hierarchical rules allows the system to avoid having to examine type and dimensions unnecessarily.

Different embodiments of the present invention may be realized by varying or combining various attributes. These attributes include, but are not limited to:

1) The structure of the data source
2) Storage and access technology of the data source
3) Metadata associated with the data
4) Descriptions of relationships among the fields
5) The range of visualizations In an embodiment of the present invention, the data may be obtained from a multidimensional data source (often referred to as a data cube or OLAP). In this embodiment, the data source comprises one or more multidimensional data stores (which may be, for example, fact tables) and auxiliary data stores that describe the dimensions of the multidimensional data stores (which may be, for example, dimension tables). For example, a data source may contain Sales, Quarter, Region, and Product. In this example, Sales may be in the central multidimensional data store, and Quarter, Region, and Product are dimensions of the sales data stored in the auxiliary data stores. The advantage of this type of structure for the data source is that much of the metadata useful for the definitions of rules can be easily deduced from the data stores.

An alternative structure for the data source is a simple collection of tables (a basic relational model whether or not implemented as a relational database). In this case, additional metadata must be obtained prior to the execution of the rules. The advantage to this type of structure for the data source is that it can be used to describe a wider variety of data sources than a multidimensional data source.

As to the storage and access technology of the data source, the data may be stored and accessed using a variety of technologies. Some of these storage and access technologies include, but are not limited to:

1) Time and space efficient multidimensional storage. This technology is most often used with multidimensional source data.
2) Relational tables. This technology may be used with multidimensional source data (ROLAP) or as a simple collection of tables.
3) Extensible Markup Language (XML). This technology is increasingly used as a general source of data.
4) Comma-Separated Values. This technology is a common way to transfer data between applications.
5) Spreadsheets. These are a common repository of business data. Various technologies exist to extract the data from the spreadsheets (including XML and CSV).

As to the Metadata associated with the data, different sources of data often have different amounts and types of metadata associated with them. Additional metadata can be provided with the data source (in addition to the metadata required for the data source to operate).

In general, the present invention takes full advantage of rich metadata environments. However, the present invention is also applicable to metadata impoverished environments.

Metadata that may be useful with the present invention include, but are not limited to:

1) Type information about a field (e.g., numeric, string, date, time, currency, etc.)
2) Purpose of the field (e.g., fact or dimension information)
3) Resolution of the field (e.g., monthly, quarterly, yearly)
4) Other properties (e.g., aggregatable)
5) Relationships between fields (e.g., a field serves as a dimension for another field, or field is functionally dependent on another field)

As to the description of relationships between fields, in an embodiment of the present invention, the main relationship between fields may be whether one field serves as a dimension for another field, for example, if Region serves as a dimension for Sales. However, a wide range of relationship information is possible and useful with the present invention.

For example, the relationship between fields may describe what fields are functionally dependent on other fields (i.e., given unique values for domain fields, is there at most one value associated with those values in the range field). For example:

1) Sales may be functionally dependent on Region, Product, and Quarter (given a specific region, a specific product, and a specific quarter, there is only one sales number associated with those values).
2) Quarter may be functionally dependent on Month (given a specific month, there is only one quarter associated with that month).
3) Month may be functionally dependent on Year and MonthName (given a specific year and a specific month name, there is only one month associated with those values).

As to the range of visualizations, typical examples of visualization include pie charts, bar charts, line charts, and radar charts. However, there are many other charts which also may be used as visualizations with the present invention. Additionally, there are other types of visualizations including, but not limited to:

1) Tables (either of simple textual information or complex structures including other visualizations)
2) Grids (also known as matrices or pivots, either of simple textual information or complex structures including other visualizations)
3) Complex report elements (such as repeating sub-reports)

It should be noted that while the present invention contemplates the automatic selection of a visualization for data, the system does not necessarily have to display the data using the selected visualization. Various embodiments are possible where the user overrides the automatic selection or the selected visualization (or visualizations) are presented to the user for verification.

FIG. 1 is a flow diagram illustrating a method for automatically visualizing data in a computer system in accordance with an embodiment of the present invention. Each act in the method may be executed in hardware, software, or any combination thereof. At 100, metadata of the data may be compared against a predefined rule set to determine if the metadata of the data match a rule in the predefined rule set. The metadata may be received with the data, or it may be determined by an analysis module. Certain types of metadata are typically included with the user's identification of the data, such as the dimensions of the data. Other types of data may be specifically indicated by the user and sent at the same time as the identification of the data. Yet other types of data, such as volume, may need to be determined by an analysis module upon inspection of the data.

Figure 2:
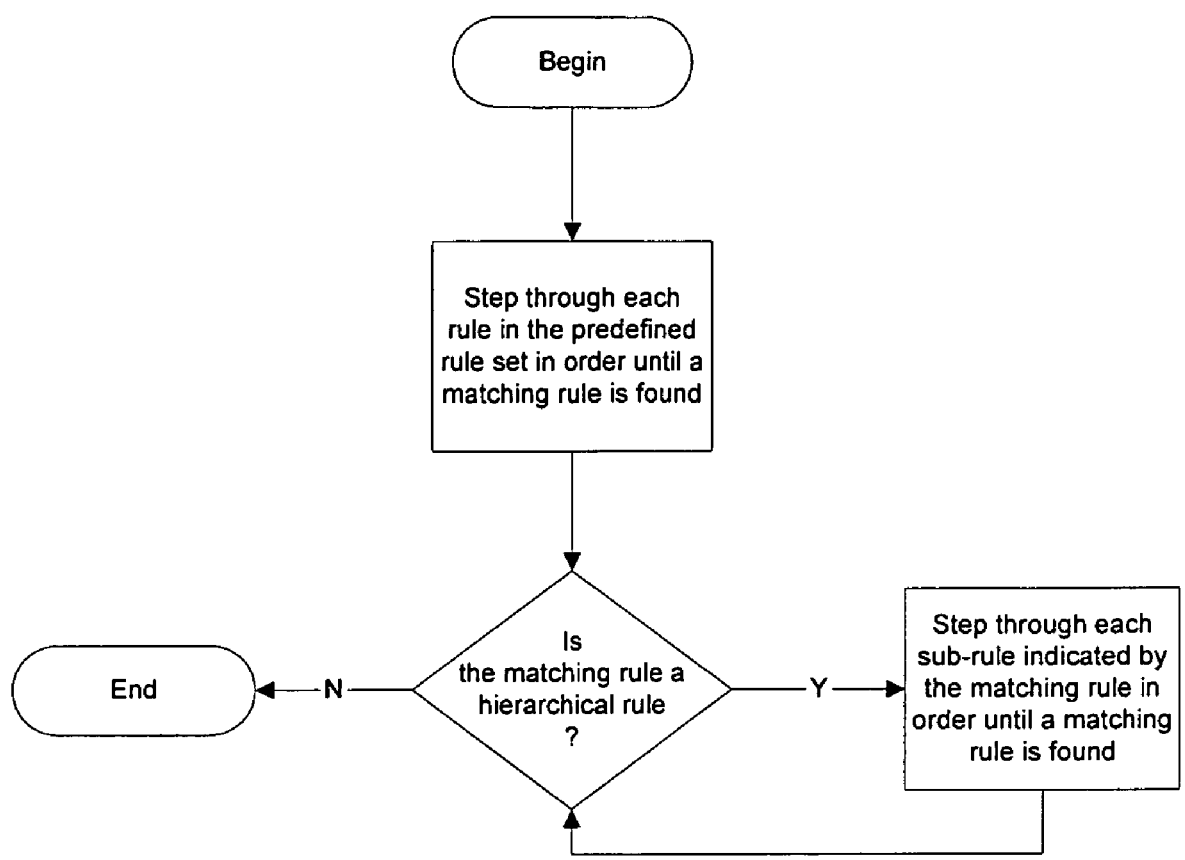
FIG. 2 is a flow diagram illustrating comparing metadata of the data against a predefined rule set to determine if the metadata of the data match a rule in the predefined rule set in accordance with an embodiment of the present invention.

FIG. 2 is a flow diagram illustrating comparing metadata of the data against a predefined rule set to determine if the metadata of the data match a rule in the predefined rule set in accordance with an embodiment of the present invention. This method describes 100 of FIG. 1 in more detail. Each act in the method may be executed in hardware, software, or any combination thereof. At 200, each rule in the predefined rule set may be stepped through in order until a matching rule is found. At 202, if the matching rule is a hierarchical rule, each sub-rule indicated by the hierarchical rule may be stepped through until a matching rule is found. This may be repeated until a matching rule is found that is not a hierarchical rule.

Referring back to FIG. 1, at 102, if a matching rule is found, the rule may be executed, wherein the rule automatically selects a visualization for the data. The visualization may be any type of visualization of data, including, for example, various charts and tables. At 104, an update to the predefined rule set may be received. This may be received from an administrator or user, and may also be automatically sent, for example, upon creation of a new report by the user. At 106, it may be determined if a report has been reconfigured or the data has changed. If so, then the process may loop back to 100. This allows the system to automatically re-check the rules, as the reconfiguration of the report or changes to the data may affect the previously selected visualizations.

Figure 3:
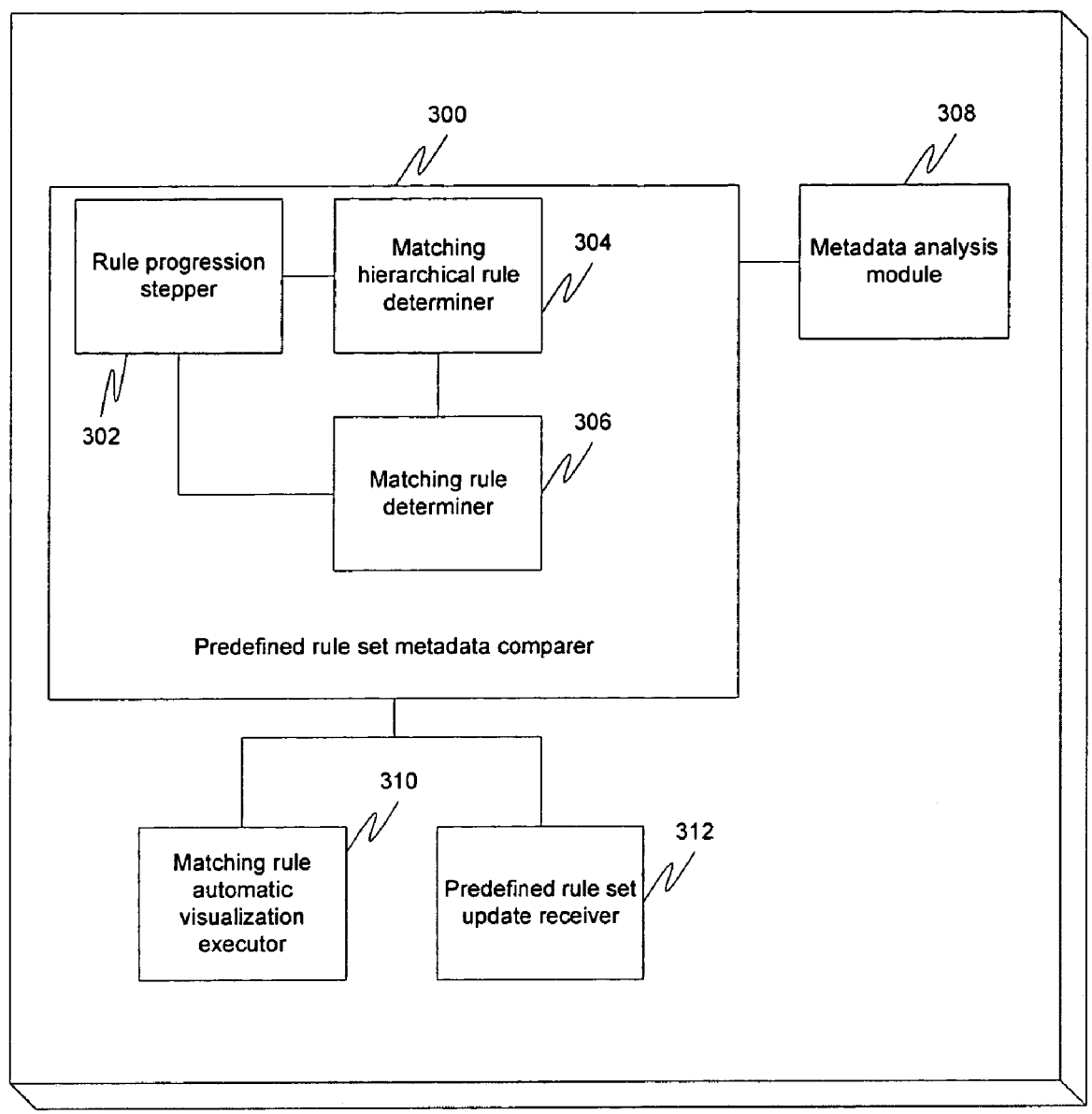
FIG. 3 is a block diagram illustrating an apparatus for automatically visualizing data in a computer system in accordance with an embodiment of the present invention.

FIG. 3 is a block diagram illustrating an apparatus for automatically visualizing data in a computer system in accordance with an embodiment of the present invention. Each element in the apparatus may be embodied in hardware, software, or any combination thereof. A predefined rule set metadata comparer 300 may compare metadata of the data against a predefined rule set to determine if the metadata of the data match a rule in the predefined rule set. The metadata may be received with the data, or it may be determined by a metadata analysis module 308 coupled to the predefined rule set metadata comparer 300. Certain types of metadata are typically included with the user's identification of the data, such as the dimensions of the data. Other types of data may be specifically indicated by the user and sent at the same time as the identification of the data. Yet other types of data, such as volume, may need to be determined by an analysis module upon inspection of the data.

The predefined rule set metadata comparer 300 may include a rule progression stepper 302, which may step through each rule in the predefined rule set in order until a matching rule is found. The predefined rule set metadata comparer 300 may also include a matching hierarchical rule determiner 304 coupled to the rule progression stepper 302, which may, if the matching rule is a hierarchical rule, step through each sub-rule indicated by the hierarchical rule until a matching rule is found by a matching rule determiner 306 coupled to the matching hierarchical rule determiner 304. This may be repeated until a matching rule is found that is not a hierarchical rule.

A matching rule automatic visualization executor 310 coupled to the predefined rule set metadata comparer 300 may, if a matching rule is found, execute the rule, wherein the rule automatically selects a visualization for the data. The visualization may be any type of visualization of data, including, for example, various charts and tables. A predefined rule set update receiver 312 coupled to the predefined rule set metadata comparer 300 may receive an update to the predefined rule set. This may be received from an administrator or user, and may also be automatically sent, for example, upon creation of a new report by the user. It may also be periodically determined if a report has been reconfigured or the data has changed. If so, then the entire process may be repeated. This allows the system to automatically re-check the rules, as the reconfiguration of the report or changes to the data may affect the previously selected visualizations.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for automatically visualizing data in a computer system, the method comprising:
   in response to receiving user input specifying a change to a predefined rule set, updating a rule in the predefined rule set;
   receiving a user selection of the data to be visualized;
   comparing metadata of the data against the predefined rule set to determine if the metadata of the data match conditions specified in a rule in the predefined rule set, wherein each rule of the predefined rule set specifies (a) a set of conditions defined exclusively by the metadata, and (b) a manner of visualizing data whose metadata satisfy the set of conditions, and wherein the metadata describe an underlying type or property about the data, and are unrelated to the user selection of the data; and
   if a matching rule is found, automatically visualizing the data according to the manner specified by the matching rule.

2. The method of claim 1, wherein the metadata of the data are received with the data.

3. The method of claim 1, wherein the metadata of the data are determined by an analysis module.

4. The method of claim 1, wherein the comparing includes stepping through each rule in the predefined rule set in order and stopping if a matching rule is found.

5. The method of claim 1, wherein the comparing includes:
   (a) stepping through each rule in the predefined rule set in order until a matching rule is found;
   (b) if the matching rule is a hierarchical rule, stepping through each sub-rule indicated by the hierarchical rule until a matching rule is found; and
   (c) repeating (b) until a matching rule is found that is not a hierarchical rule.

6. The method of claim 1, further comprising receiving an update to the predefined rule set from an administrator.

7. The method of claim 1, further comprising receiving an update to the predefined rule set from a user.

8. The method of claim 7, wherein the update to the predefined rule set is received upon creation of a new report by a user.

9. The method of claim 1, wherein the data is automatically visualized in the manner of a chart.

10. The method of claim 1, wherein the data is automatically visualized in the manner of a table.

11. The method of claim 1, wherein said comparing and said visualizing are re-executed upon notification that the data has changed.

12. The method of claim 1, wherein said comparing and said visualizing are re-executed upon the reconfiguration of a report.

13. A program storage device readable by a machine, tangibly embodying a program of instructions executable by the machine to perform a method for automatically visualizing data in a computer system, the method comprising:
   in response to receiving user input specifying a change to a predefined rule set, updating a rule in the predefined rule set;
   receiving a user selection of the data to be visualized
   comparing metadata of the data against the predefined rule set to determine if the metadata of the data match conditions specified in a rule in the predefined rule set, wherein each rule of the predefined rule set specifies (a) a set of conditions defined exclusively by the metadata, and (b) a manner of visualizing data whose metadata satisfy the set of conditions, and wherein the metadata describe an underlying type or property about the data, and are unrelated to the user selection of the data; and if a matching rule is found, automatically visualizing the data according to the manner specified by the matching rule.

14. The program storage device of claim 13, wherein the metadata of the data are received with the data.

15. The program storage device of claim 13, wherein the metadata of the data are determined by an analysis module.

16. The program storage device of claim 13, wherein the comparing includes stepping through each rule in the predefined rule set in order and stopping if a matching rule is found.

17. The program storage device of claim 13, wherein the comparing includes:
 (a) stepping through each rule in the predefined rule set in order until a matching rule is found;
 (b) if the matching rule is a hierarchical rule, stepping through each sub-rule indicated by the hierarchical rule until a matching rule is found; and
 (c) repeating (b) until a matching rule is found that is not a hierarchical rule.

18. The program storage device of claim 13, further comprising receiving an update to the predefined rule set from an administrator.

19. The program storage device of claim 13, further comprising receiving an update to the predefined rule set from a user.

20. The program storage device of claim 19, wherein the update to the predefined rule set is received upon creation of a new report by a user.

21. The program storage device of claim 13, wherein the data is automatically visualized in the manner of a chart.

22. The program storage device of claim 13, wherein the data is automatically visualized in the manner of a table.

23. The program storage device of claim 13, wherein said comparing and said visualizing are re-executed upon notification that the data has changed.

24. The program storage device of claim 13, wherein said comparing and said visualizing are re-executed upon the reconfiguration of a report.

* * * * *

UNITED STATES PATENT AND TRADEMARK OFFICE
CERTIFICATE OF CORRECTION

| | | |
|---|---|---|
| PATENT NO. | : 7,606,835 B2 | Page 1 of 1 |
| APPLICATION NO. | : 11/354348 | |
| DATED | : October 20, 2009 | |
| INVENTOR(S) | : William Taylor Laaser et al. | |

It is certified that error appears in the above-identified patent and that said Letters Patent is hereby corrected as shown below:

In column 8, line 60, in claim 13, after "visualized" insert -- ; --.

Signed and Sealed this

Seventeenth Day of August, 2010

David J. Kappos
*Director of the United States Patent and Trademark Office*